(12) United States Patent
Niem

(10) Patent No.: US 8,803,694 B2
(45) Date of Patent: Aug. 12, 2014

(54) ASSISTANCE SYSTEM FOR A MOTOR VEHICLE

(75) Inventor: Wolfgang Niem, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 512 days.

(21) Appl. No.: 12/803,114

(22) Filed: Jun. 17, 2010

(65) Prior Publication Data

US 2011/0006903 A1 Jan. 13, 2011

(30) Foreign Application Priority Data

Jul. 8, 2009 (DE) .......................... 10 2009 027 547

(51) Int. Cl.
*G08B 23/00* (2006.01)
*G08B 21/00* (2006.01)
(52) U.S. Cl.
USPC ......... 340/576; 340/500; 340/540; 340/573.1
(58) Field of Classification Search
CPC ........... G08B 21/06; G08B 21/22; G08B 3/10
USPC ................. 340/500, 540, 573.1, 576
See application file for complete search history.

(56) References Cited

U.S. PATENT DOCUMENTS

| 5,835,028 | A * | 11/1998 | Bender et al. ................. 340/937 |
| 7,295,682 | B2 * | 11/2007 | Otsuka et al. ................ 382/103 |
| 7,411,486 | B2 * | 8/2008 | Gern et al. ..................... 340/438 |
| 7,463,138 | B2 * | 12/2008 | Pawlicki et al. .............. 340/435 |
| 7,772,991 | B2 * | 8/2010 | Rao ............................... 340/937 |
| 7,825,828 | B2 * | 11/2010 | Watanabe et al. .......... 340/932.2 |
| 2004/0164851 | A1 * | 8/2004 | Crawshaw ..................... 340/435 |
| 2006/0132295 | A1 * | 6/2006 | Gern et al. ..................... 340/438 |
| 2007/0091173 | A1 * | 4/2007 | Kade et al. .................... 348/119 |
| 2008/0258884 | A1 * | 10/2008 | Schmitz ..................... 340/425.5 |
| 2009/0174536 | A1 * | 7/2009 | Rao ............................... 340/436 |
| 2010/0002911 | A1 * | 1/2010 | Wu et al. ....................... 382/104 |
| 2010/0060486 | A1 * | 3/2010 | Nakashima et al. ....... 340/932.2 |
| 2010/0066515 | A1 * | 3/2010 | Shimazaki et al. ........... 340/435 |
| 2011/0006903 | A1 * | 1/2011 | Niem ............................ 340/576 |
| 2011/0103650 | A1 * | 5/2011 | Cheng et al. ................. 382/104 |
| 2011/0196576 | A1 * | 8/2011 | Stahlin ........................... 701/42 |

* cited by examiner

*Primary Examiner* — Daniel Wu
*Assistant Examiner* — Kam Ma
(74) *Attorney, Agent, or Firm* — Kenyon & Kenyon LLP

(57) ABSTRACT

A driver-assistance system for a motor vehicle includes a recording device for recording an environment of the motor vehicle including a rear environment of the motor vehicle, a warning device for generating a warning signal, and an evaluation device. The evaluation device is configured to analyze a current driving behavior of the driver on the basis of the recorded environment of the motor vehicle, and to induce the warning device to generate a warning signal if the evaluation device detects a deviation of the driving behavior from a predetermined setpoint behavior.

4 Claims, 2 Drawing Sheets

ASSISTANCE SYSTEM FOR A MOTOR VEHICLE

BACKGROUND OF THE INVENTION

1. Field of the Invention

The present invention relates to an assistance system for a motor vehicle and to a method for assisting a driver of a motor vehicle, the driver being warned if the driving behavior deviates from a setpoint behavior.

2. Description of Related Art

Scientific studies assume that between ten and twenty percent of all serious traffic accidents are attributable to fatigue or inattention of vehicle drivers. To avoid accidents, increased use is made of assistance systems, with whose aid the state of a driver or a deviation from a setpoint behavior is able to be detected. Such systems are currently found mainly in motor vehicles in the upper price range.

Current systems for driver-state detection are frequently based on camera systems that record the face of the driver in the vehicle and detect the eyelid movement. This makes it possible to determine whether the driver nods off, which is referred to as microsleep, so that the driver can be warned in a timely manner.

Furthermore, assistance systems are known in which a front camera optically records the environment in front of a motor vehicle and determines the position of the motor vehicle in the traffic lane with the aid of road lane markings. Such systems are designed to derive the performance of the driver based on keeping in lane, and to generate a fatigue warning on this basis. However, it is disadvantageous that the use of such a system featuring a camera in the front is relatively cost-intensive, and as a result is currently restricted to vehicles in the upper price range.

BRIEF SUMMARY OF THE INVENTION

An object of the present invention is to provide an improved assistance system for a motor vehicle and an improved method for assisting a driver of a motor vehicle.

According to the present invention, an assistance system for a motor vehicle is provided which includes a recording device for optically recording an environment of the vehicle, a warning device for generating a warning signal, and an evaluation device. The evaluation device is designed to analyze a current driving behavior of the driver based on the recorded environment of the motor vehicle. Moreover, the evaluation device is designed to induce the warning device to generate a warning signal if the evaluation device has detected a driving behavior that deviates from a setpoint behavior. The assistance system is characterized by the fact that the recording device is designed to record a rear environment of the vehicle.

Instead of recording a front environment of the motor vehicle, the assistance system uses the recording device to record a rear environment. Such rear-side recording devices are more prevalent these days than the afore-described cameras in the front, and they are used as backup camera, for example, in order to facilitate the backing up of a motor vehicle. Furthermore, rear recording devices will be found more frequently as a result legal requirements, for example in the U.S., for avoiding backovers. The assistance system utilizes this situation to employ the already existing detection devices, or the detection devices used or required in the future, for the purpose of determining the state of the driver.

In one example embodiment, the evaluation device is designed to determine a traveled trajectory of the vehicle within the framework of analyzing the driving behavior, using the recorded rear environment of the vehicle as the basis. This may be accomplished particularly in that the evaluation device detects road or traffic lane markings in the recorded rear environment. Based on the traveled trajectory, the evaluation device is able to determine a deviation of the driving behavior from a setpoint behavior in a reliable manner.

For this purpose, the evaluation device is preferably designed to compare a current or fairly recent section of the trajectory with a section of the trajectory that lies farther back. Using the section of the trajectory lying in the back, the evaluation device is able to derive characteristics that are linked to the specific driving behavior of the driver. The previous section may relate to the beginning of a ride, in particular, so that it may be assumed that the driver was still awake and fit to drive at this point in time. The previous section of the trajectory may therefore be used as "setpoint trajectory", so that a deviation from a setpoint behavior is able to be determined by comparing the current section of the trajectory to this reference trajectory.

In one alternative or additional development, the evaluation device is preferably designed to evaluate an estimated time to a (possible) crossing of a lateral road delimitation or side delimitation ("time to crossing") with the aid of the trajectory, in order to infer the driving fitness.

In one further example embodiment, the assistance system also has a device for determining a current location of the motor vehicle on a road. The evaluation device is designed to analyze the driving behavior additionally on the basis of the determined location of the motor vehicle. This provides the option of taking not only the recorded rear environment of the motor vehicle into account when analyzing the driving behavior, but also the precise (future) road course, with the result that a deviation from a setpoint behavior is able to be determined with high precision and reliability. The device for determining the current location may include in particular a receiver for receiving a locating signal and a device for providing a digital map.

Furthermore, the assistance system may include one or a plurality of additional device(s) or be linked to additional devices, so that the evaluation device may consider additional signals or data when analyzing the driving behavior. These may be turning signals, for instance.

In another example embodiment, the evaluation device is designed to estimate a (future) course of a road to be traveled within the framework of analyzing the driving behavior. In so doing, the evaluation device may employ a statistical extrapolation method.

In one further example embodiment, the warning device is designed to generate the warning signal in an optical, acoustic and/or haptic manner.

According to the present invention, a method for assisting a driver of a motor vehicle is provided in addition, which includes an optical recording of an environment of the motor vehicle, an analysis of a current driving behavior of the driver on the basis of the recorded environment of the motor vehicle, and the generation of a warning signal if a deviation of the driving behavior from a setpoint behavior is determined. The method is characterized by the fact that a rear environment of the motor vehicle is recorded. According to the assistance system described above, the method utilizes the fact that rear-side detection devices are already fairly common or will be fairly common in the future.

DETAILED DESCRIPTION OF THE INVENTION

Figure 1:
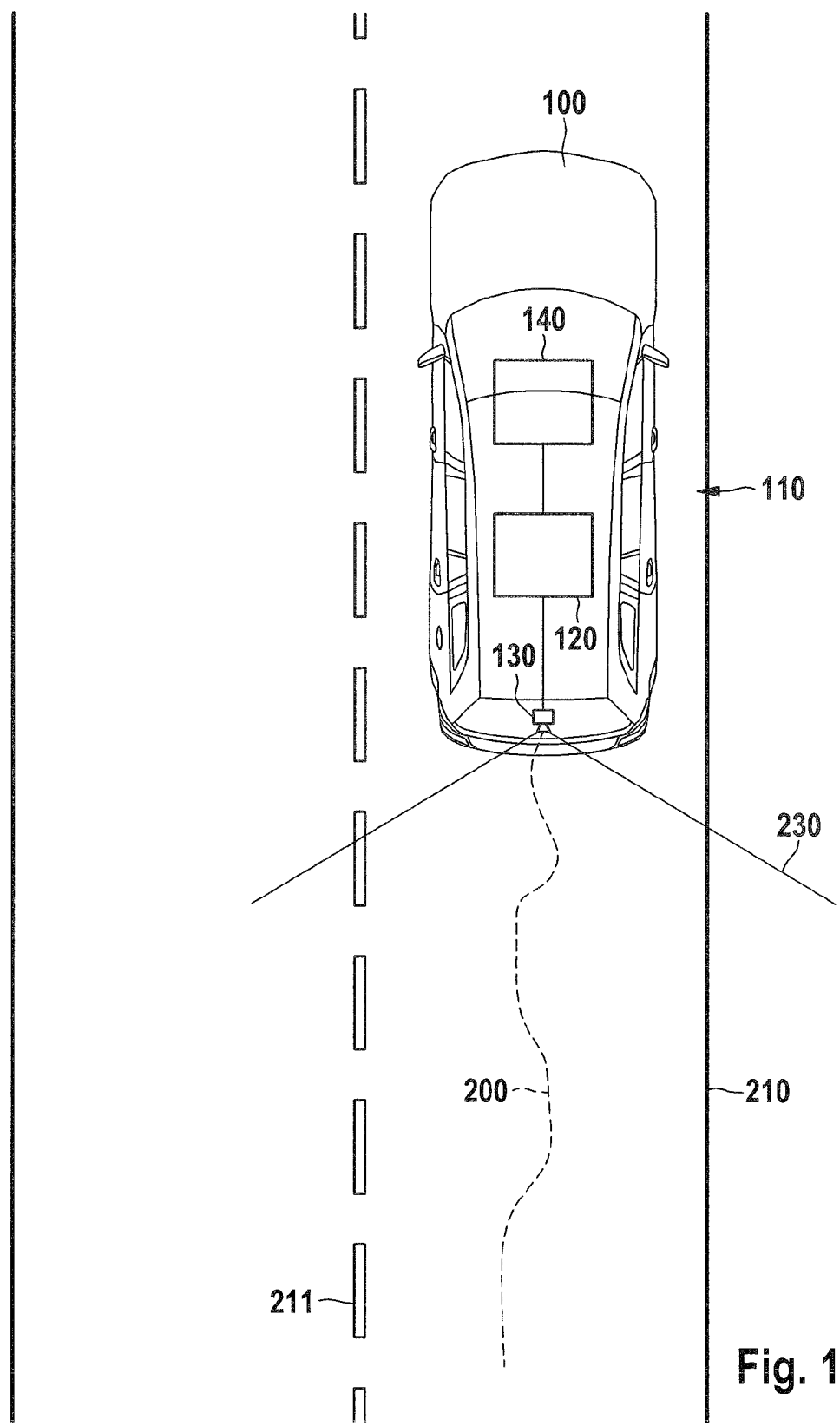
FIG. 1 shows a schematic representation of a motor vehicle traveling on a road, the vehicle being equipped with an assistance system.

FIG. 1 shows a motor vehicle 100 traveling on a road in a schematic illustration. The road is illustrated using road lane markings, i.e., lateral traffic lane markings 210 and a median strip 211.

Motor vehicle 100, which may be a conventional sedan as indicated in FIG. 1, is equipped with an assistance system 110. With the aid of assistance system 110, a driver of motor vehicle 100 is able to be warned in the event of fatigue or inattention, so that greater traffic safety is realizable.

Assistance system 110 has a device 120 for data processing, evaluation and control, which is referred to as evaluation device 120 in the following text. Another possible designation for evaluation device 120 is control device, processing unit or head unit. Evaluation device 120 is connected to a camera 130 disposed on a rear side of motor vehicle 100, and to a warning device 140. Camera 130 is used for optically recording a rear environment of motor vehicle 100. Based on the recorded rear environment, evaluation device 120 performs an analysis of the driving behavior, as described further down, and induces warning device 140 to generate a warning signal if evaluation device 120 determines a deviation from a setpoint behavior.

Since camera 130 may also be used to facilitate a backup operation, camera 130 will be referred to as backup camera 130 in the following text. The use of backup camera 130 may, for instance, be mandated by law in order to prevent the vehicle from rolling over third parties when backing up. The images recorded by backup camera 130 are displayed on a display device or a display inside vehicle 100. An angular sector or recording range 230 covered by backup camera 130 is indicated by lines in FIG. 1.

Warning device 140, which is activated by evaluation device 120 if a deviation from a setpoint behavior is determined, is designed to generate the warning signal in optical, acoustic and/or haptic manner. For example, warning device 140 includes a display device on which a graphical warning signal is able to be reproduced. The display device may be the afore-described display device, in particular, on which the images recorded by backup camera 130 are shown. Furthermore, warning device 140 may include a loudspeaker or a loudspeaker system in order to generate an acoustic warning signal. The loudspeaker system may be part of an audio system of motor vehicle 100. To generate a haptic warning, warning device 140 includes a haptic module, for example. The haptic module, with whose aid a warning in the form of vibrations is able to be generated, is realized as integrated part in the driver seat or the steering device of motor vehicle 100, for instance.

To analyze the driving behavior, evaluation device 120 determines the position of motor vehicle 100 on the traveled road(s) over the time, using the environment recorded in the rear, and determines a traveled trajectory 200 of motor vehicle 100, as indicated in FIG. 1 by a dashed line. Evaluation device 120 is designed to detect particularly road and traffic lane markings 210, 211 of the driven road in order to track the position of motor vehicle 100. Further clues with whose aid evaluation device 120 is able to determine trajectory 200 of motor vehicle 100 are differences in contrast in the region of curbs and road edges, for instance.

Based on determined trajectory 200 of motor vehicle 100, evaluation device 120 performs an analysis of the driving behavior. Towards this end, evaluation device 120 may compare a current or close to current section of trajectory 200 with a more distant section, a statistical method being used. In so doing, evaluation device 120 records specific features and characteristics of trajectory 200 that are linked to the driving behavior of the driver in order to contrast them. Among these features are, for example, (typical) steering and rolling motions that occur during the ride.

As previous section of trajectory 200, which may function as "setpoint trajectory", evaluation device 120 may consider especially a section at the beginning of the ride in vehicle 100, so that a normal, attentive driving behavior may be assumed at the outset. In other words, evaluation device 120 calculates parameters of a "setpoint behavior" from the previous section of trajectory 200.

By comparing the specific characteristics of the past and the current section of trajectory 200, evaluation device 120 is therefore able to detect whether the current driving behavior deviates from a setpoint behavior, or whether the deviation has reached an extent such that fatigue or inattention of the driver may be inferred, in order to then warn the driver (by activating warning device 140).

Apart from the afore-described evaluation of trajectory 200 or the comparing of sections of trajectory 200, evaluation device 120 may, in addition or as an alternative, use further "clues" for detecting a deviation of the driving behavior from a setpoint behavior. One possible method consists of evaluation device 120 estimating a (close) future course through extrapolation based on the course of the road recorded in the rear, and taking it into account as well when analyzing the current driving behavior or when providing a basis for a setpoint behavior.

The assumed future course of the road may be compared particularly with the instantaneous position and movement direction of motor vehicle 100 on a road in an effort to detect a deviation from a setpoint behavior. The position and movement direction of motor vehicle 100 are determined with the aid of the rear environment recorded by backup camera 130, or with the aid of a current section of a trajectory 200. For example, if a straight road section (recorded via the rear) is present, and if the (current) movement of motor vehicle 100 is at an angle to the road, so that an (imminent) departure from the road and thus a deviation from a setpoint behavior may be assumed, then evaluation device 120 is able to induce warning device 140 to generate a corresponding warning signal in such a case as well.

In the procedures described above, the analysis of the current driver behavior is based on the rear environment recorded using backup camera 130, and a possibly implemented extrapolation. Moreover, however, it is also conceivable to additionally consider a geographic location of motor vehicle 100 on a road obtained by position determination, thereby making it possible to determine the attention with high accuracy and reliability.

Figure 2:
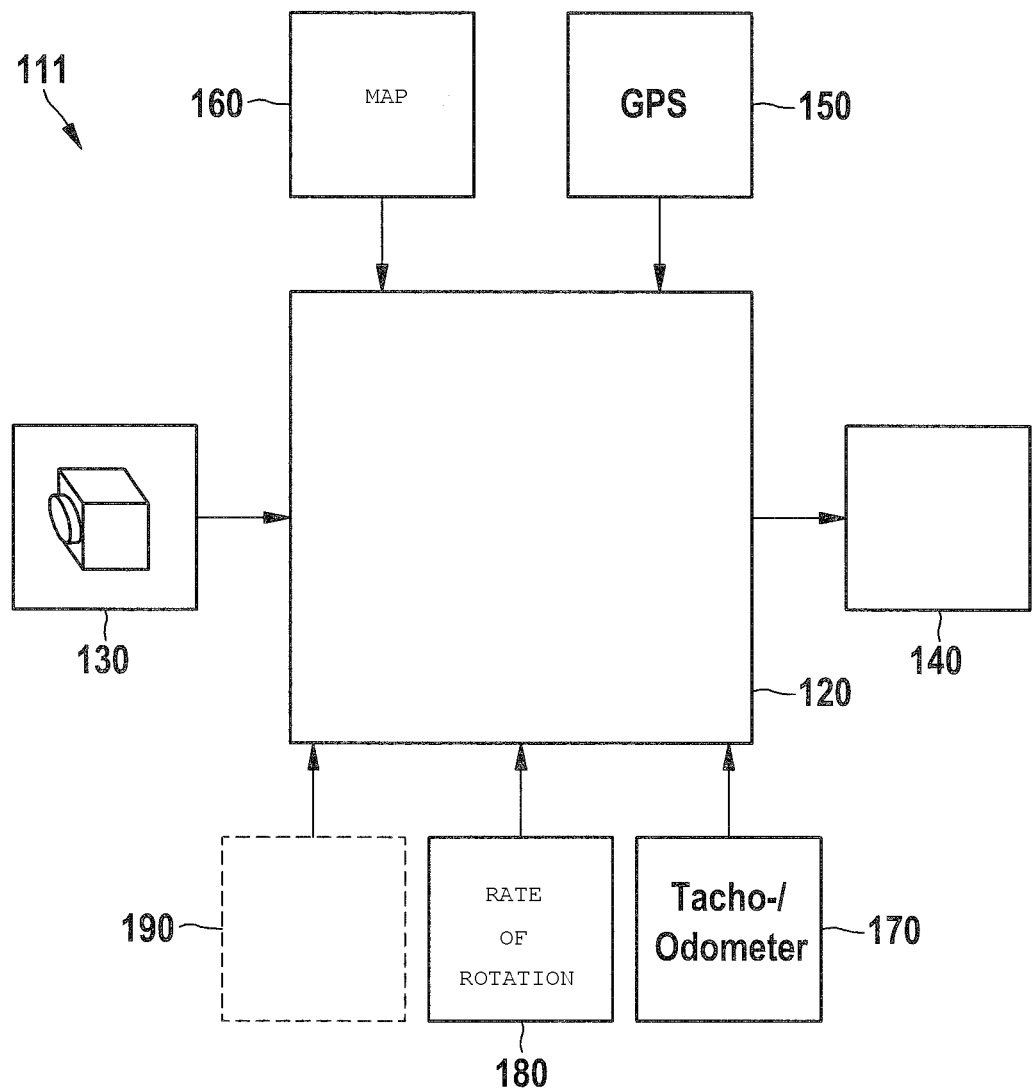
FIG. 2 shows a schematic block diagram of a further assistance system.

For illustration purposes, FIG. 2 shows a schematic block diagram of a further assistance system 111, which may likewise be used in motor vehicle 100 of FIG. 1. Similar to assistance system 110, assistance system 111 has a backup camera 130, an evaluation device 120, and a warning device 140. Reference is therefore made to the above explanations as far as details of these components are concerned.

As additional components, assistance system 111 includes a receiver 150 for receiving a locating signal—e.g., a GPS signal, with whose aid the current geographical position of motor vehicle 100 is able to be determined. Also provided is a device 160 for providing a digital map. For instance, device 160 is a storage device in which the digital map is stored. It is also possible to provide device 160 as a reading device, in which a storage medium such as a memory card or a memory stick having map information may be used. Assistance system 111 may represent a navigation system or part of such a system.

Furthermore, as shown in FIG. 2, assistance system 111 may include a device 170 for determining a vehicle speed (tachometer) or a traveled distance (odometer), as well as an engine speed sensor 180 for determining a rate of rotation of motor vehicle 100. Engine speed sensor 180 may simultaneously be a component of a driving-dynamics control such as an electronic stability program (ESP), in particular.

On the basis of a locating signal received by receiver 150, and the map provided by device 160, evaluation device 120 is able to determine the current location of motor vehicle 100 on a road, and thus the precise future driving route of motor vehicle 100. Evaluation device 120 makes use of these data in addition to analyzing the current driving behavior, or when providing the base for a setpoint behavior. Even without receiving a GPS signal, e.g., when driving through a tunnel or in a narrow inner city environment, evaluation device 120 is able to bridge the determination of the location of motor vehicle 100 with the aid of the outputs of tachometer/odometer 170 and engine speed sensor 180 in conjunction with the digital map provided by device 160.

According to the course of the route estimated by extrapolation, the driving route (lying ahead) of motor vehicle 100, which is known because of the vehicle location, is able to be compared with the current position and direction of movement of motor vehicle 100 on a road, in order to determine a deviation from a setpoint behavior or an (imminent) departure from the road. The position and movement direction of motor vehicle 100 are determined with the aid of the rear environment recorded by backup camera 130 or with the aid of a current section of a trajectory 200 (provided such a trajectory 200 is determined).

Furthermore, as sketched in FIG. 2, assistance system 111 may include one or a plurality of additional device(s) 190 or be linked to such a device 190, in order to supply evaluation device 120 with further vehicle signals or vehicle data that may be taken into account when analyzing the current driving behavior. Among these are turning signals, for example, so that an intended departure from a road lane, for example, is able to be detected on this basis.

The specific embodiments explained with the aid of the figures, represent exemplary embodiments of the present invention for detecting a driver condition by analyzing series of images from a backup camera. Instead of the exemplary embodiments described, additional embodiments are conceivable, which may include further modifications or combinations.

What is claimed is:

1. An assistance system for a motor vehicle, comprising:
   a recording device of the motor vehicle configured to optically record a rear environment of the motor vehicle, the recording device recording images of a traveled trajectory of the motor vehicle including at least a first traveled trajectory portion corresponding to a first time period and a second traveled trajectory portion corresponding to a second time period more recent than the first time period;
   a warning device configured to generate a warning signal;
   a device configured to determine a current geographical location of the motor vehicle; and
   an evaluation device configured to: (a) analyze a driving behavior of a driver of the motor vehicle on the basis of (i) a comparison of driving behaviors derived from at least the characteristics of the first and second traveled trajectory portions, wherein a setpoint driving behavior is derived from at least the characteristics of the first traveled trajectory portion and a current driving behavior is derived from at least the characteristics of the second traveled trajectory portion, and (ii) the determined current geographical location of the motor vehicle, wherein the evaluation device is configured to estimate a course of a road to be traveled based on the first and second traveled trajectory portions; and (b) induce the warning device to generate a warning signal if the evaluation device detects a deviation of the current driving behavior from the setpoint driving behavior.

2. The assistance system as recited in claim 1, wherein the warning device is configured to generate the warning signal at least one of optically, acoustically and haptically.

3. A method for providing automated driving-assistance to a driver of a motor vehicle, comprising:
   optically recording, using a recording device configured to record a rear environment of the motor vehicle, images of a traveled trajectory of the motor vehicle including at least a first traveled trajectory portion corresponding to a first time period and a second traveled trajectory portion corresponding to a second time period more recent than the first time period;
   determining a current geographical location of the motor vehicle;
   analyzing a driving behavior of the driver on the basis of (i) a comparison of driving behaviors derived from at least the characteristics of the first and second traveled trajectory portions, wherein a setpoint driving behavior is derived from at least the characteristics of the first traveled trajectory portion and a current driving behavior is derived from at least the characteristics of the second traveled trajectory portion, and (ii) the determined current geographical location of the motor vehicle, wherein the analysis of the driving behavior further includes estimation of a course of the road to be traveled based on the first and second traveled trajectory portions; and
   generating a warning signal if a deviation of the current driving behavior from the setpoint driving behavior is detected.

4. The method as recited in claim 3, wherein the warning signal is generated at least one of optically, acoustically and haptically.

* * * * *